United States Patent
Matsui et al.

(10) Patent No.: US 9,626,153 B2
(45) Date of Patent: Apr. 18, 2017

(54) CONTROL DEVICE AND CONTROL METHOD

(71) Applicant: FUJITSU LIMITED, Kawasaki-shi, Kanagawa (JP)

(72) Inventors: Hideki Matsui, Kanazawa (JP); Kuniaki Fujii, Hakui (JP)

(73) Assignee: FUJITSU LIMITED, Kwasaki (JP)

( * ) Notice: Subject to any disclaimer, the term of this patent is extended or adjusted under 35 U.S.C. 154(b) by 61 days.

(21) Appl. No.: 14/825,469

(22) Filed: Aug. 13, 2015

(65) Prior Publication Data

US 2016/0077799 A1 Mar. 17, 2016

(30) Foreign Application Priority Data

Sep. 16, 2014 (JP) .................. 2014-187836

(51) Int. Cl.
| | |
|---|---|
| G06F 11/00 | (2006.01) |
| G06F 5/14 | (2006.01) |
| G06F 5/06 | (2006.01) |
| G06F 13/42 | (2006.01) |
| G06F 13/40 | (2006.01) |
| G06F 11/07 | (2006.01) |
| G06F 11/30 | (2006.01) |

(52) U.S. Cl.
CPC .............. *G06F 5/14* (2013.01); *G06F 5/065* (2013.01); *G06F 11/0745* (2013.01); *G06F 11/0757* (2013.01); *G06F 11/3024* (2013.01); *G06F 11/3027* (2013.01); *G06F 13/4022* (2013.01); *G06F 13/4282* (2013.01); *G06F 11/3031* (2013.01)

(58) Field of Classification Search
USPC .......................................................... 714/25
See application file for complete search history.

(56) References Cited

U.S. PATENT DOCUMENTS

| | | | | |
|---|---|---|---|---|
| 4,802,161 A | * | 1/1989 | Byars ...................... | H04L 12/56 370/463 |
| 5,448,558 A | * | 9/1995 | Gildea .................... | G06F 13/28 370/412 |
| 5,664,223 A | * | 9/1997 | Bender ................... | G06F 13/28 710/22 |
| 5,761,526 A | | 6/1998 | Sakakura et al. | |

(Continued)

FOREIGN PATENT DOCUMENTS

| | | |
|---|---|---|
| JP | 8-328759 | 12/1996 |
| JP | 2006-76175 | 3/2006 |
| JP | 2013-61841 | 4/2013 |

*Primary Examiner* — Amine Riad
(74) *Attorney, Agent, or Firm* — Staas & Halsey LLP

(57) ABSTRACT

A control device includes a first processor, a relay device, a second processor, and a third processor. The first processor is configured to perform data communications with an electronic device. The relay device is configured to relay the data communications. The relay device includes a buffer for storing data to be transmitted or received in the data communications. The second processor is configured to check a state of the buffer to detect a buffer full state in which the buffer is full. The third processor is configured to check a state of the first processor to detect a halt state in which the first processor has halted. The third processor is configured to reset the relay device upon detecting the halt state and upon the second processor detecting the buffer full state.

12 Claims, 6 Drawing Sheets

(56) References Cited

U.S. PATENT DOCUMENTS

| | | | | |
|---|---|---|---|---|
| 5,765,004 A | * | 6/1998 | Foster | G06F 1/24 713/100 |
| 6,311,237 B1 | * | 10/2001 | Suzuki | G06F 11/0733 710/15 |
| 6,526,467 B1 | * | 2/2003 | Joh | G06F 13/4022 370/412 |
| 6,792,527 B1 | * | 9/2004 | Allegrucci | G06F 1/24 711/166 |
| 7,519,796 B1 | * | 4/2009 | Golla | G06F 9/3814 712/225 |
| 7,657,669 B2 | * | 2/2010 | Kuo | G06F 13/423 710/1 |
| 7,889,659 B2 | * | 2/2011 | Montalvo | H04L 47/10 370/236 |
| 8,054,847 B2 | * | 11/2011 | Albrecht | H04L 47/10 370/412 |
| 2004/0102950 A1 | * | 5/2004 | Agarwala | G06F 11/3636 703/23 |
| 2006/0120289 A1 | * | 6/2006 | Cunningham | H04L 47/10 370/235 |
| 2009/0132061 A1 | * | 5/2009 | Stubbs | A61N 1/3706 700/8 |
| 2010/0332909 A1 | * | 12/2010 | Larson | G06F 11/3476 714/40 |
| 2011/0235518 A1 | * | 9/2011 | Halabi | H04L 47/263 370/237 |
| 2013/0083830 A1 | * | 4/2013 | Locke | H04L 1/1822 375/222 |
| 2013/0208593 A1 | * | 8/2013 | Nandagopal | H04L 47/00 370/232 |
| 2015/0229575 A1 | * | 8/2015 | Bottorff | H04L 47/12 370/230 |
| 2016/0248689 A1 | * | 8/2016 | Akhbarizadeh | H04L 47/30 |

* cited by examiner

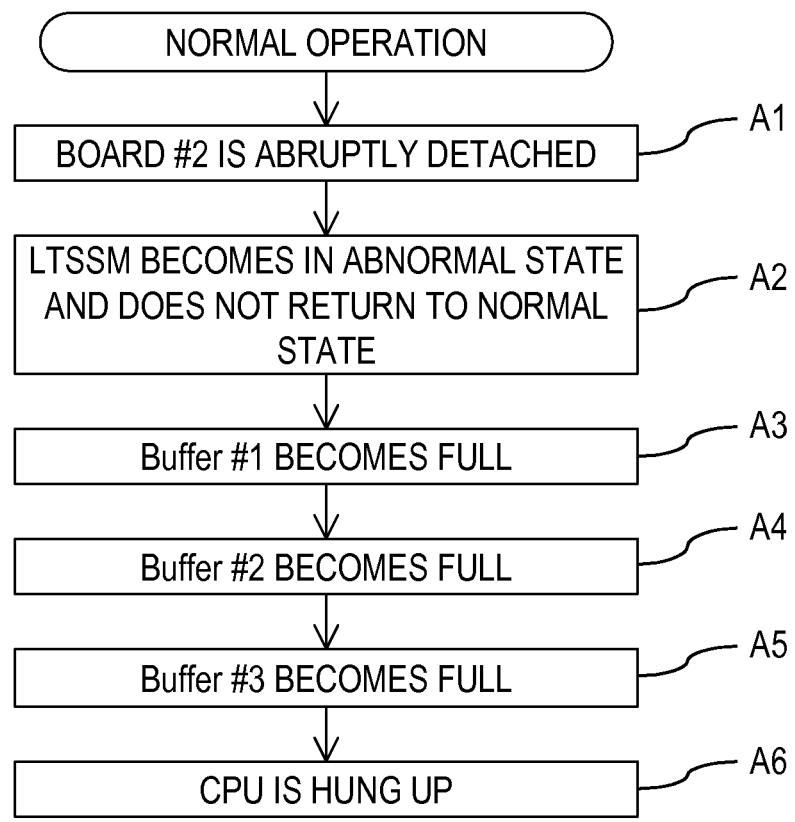

CONTROL DEVICE AND CONTROL METHOD

CROSS-REFERENCE TO RELATED APPLICATION

This application is based upon and claims the benefit of priority from the prior Japanese Patent Application No. 2014-187836 filed on Sep. 16, 2014, the entire contents of which are incorporated herein by reference.

FIELD

The embodiments discussed herein are related to a control device and a control method.

BACKGROUND

The peripheral component interconnect express (PCIe) protocol provides a link training and status state machine (LTSSM) function for managing the state of a PCIe link. The LTSSM monitors packets transmitted/received in a physical layer (PHY) and manages the state of the PCIe link by changing the state between a plurality of operation states (LTSSM states).

In a PCIe switch, the state of the LTSSM at the PHY may transit to an abnormal state and remain in the abnormal state without being returned to a normal state due to, for example, a noise caused by an abrupt removal of a link partner or turning off of a power supply. In this case, since the LTSSM is in an abnormal state, the PCIe switch is unable to operate correctly and fails to inform a software layer of a link down. Further, even though the PCIe switch is supposed to reply an access to a device which has already undergone the link down with an Unsupported Request (UR), since the LTSSM is in an abnormal state, the PCIe switch continuously queues in its buffer. As a result, the buffer becomes full, a blocking occurs, and finally a buffer full state of a central processing unit (CPU), which is a root complex, is caused, which results in a CPU hang up.

FIG. 5 is a diagram illustrating a configuration of a conventional electronic device equipped with a PCIe switch. An electronic device 1000 illustrated in FIG. 5 includes boards 1100 and 1200, and the board 1200 is detachably connected to a connector 1300 of the board 1100. For example, the boards 1100 and 1200 are a controller module (CM) and a channel adapter (CA) of a storage device, respectively. Hereinafter, the board 1100 and the board 1200 may also be referred to as a board #1 and a board #2, respectively.

The board 1100 includes a CPU 1001, a field-programmable gate array (FPGA) 1002, and a switch 1003. The CPU 1001 is a processing device performing various controls and operations. The CPU 1001 is communicably connected with the board 1200 through a switch 1003. The CPU 1001 is provided with a buffer 1011 and data (packet) to be transmitted to the switch 1003 is stored in the buffer 1011. The buffer 1011 includes a plurality of data storage areas, and data (packet) to be transmitted is sequentially stored in the plurality of data storage areas and handled in, for example, a first-in first-out (FIFO) fashion.

The CPU 1001 is connected with the FPGA 1002. The FPGA 1002 is an integrated circuit for which an arbitrary configuration may be set up and implements various functions according to preset settings. For example, when the CPU 1001 falls in a hang up state, the FPGA 1002 outputs a reset signal to the CPU 1001 so as to perform a system reset. The switch 1003 relays a data transfer. The switch 1003 includes a plurality of ports, and devices of data transmission sources and data transmission destinations are connected to the ports. For example, the CPU 1001 is connected to a port of the switch 1003 and a switch 1201 of the board 1200 is connected to another port.

A buffer 1013 is provided in each of the ports of the switch 1003 and stores data transmitted and received through the port. The buffer 1013 of the switch 1003 also includes a plurality of data storage areas, and data to be transmitted is sequentially stored in the plurality of data storage areas and handled in, for example, a FIFO fashion. Hereinafter, for the convenience of explanation, the buffer 1013 of the port connected with a switch 1201 of the board 1200 is referred to as a buffer #1 and the buffer 1013 of the port connected with the CPU 1001 is referred to as a buffer #2, in the switch 1003.

In the CPU 1001, the buffer 1011 of the port connected with the switch 1003 is referred to as a buffer #3. The board 1200 includes the switch 1201 which is connected with the switch 1003 through the connector 1300. Descriptions will be made on a process in which a CPU hang up occurs in the conventional electronic device equipped with a PCIe switch with reference to a flowchart illustrated in FIG. 6.

The board 1100 normally operates in a state of being connected with the board 1200. In this state, it is assumed that the board 1200 is abruptly detached from the connector 1300 (A1). Then, in the switch 1003, the LTSSM state is changed from a normal state to an abnormal state and may remain in the abnormal state without being returned to the normal state (A2). In the switch 1003 of the board 1100, since data is unable to be transmitted to the board 1200, the buffer #1 is filled with data to be transmitted to the switch 1201, which is a disconnected link partner, to become a buffer full state (A3).

In the switch 1003, since data is unable to be transmitted to the buffer #1, the buffer #2 becomes a buffer full state (A4). In the CPU 1001, since data is unable to be transmitted to the switch 1003, the buffer #3 becomes a buffer full state (A5), and the CPU 1001 is hung up (A6).

When the CPU 1001 is hung up, the FPGA 1002 detects the CPU hang up and outputs a reset signal to the CPU 1001 to perform a system reset.

A related technique is disclosed in, for example, Japanese Laid-Open Patent Publication No. 2013-61841.

However, when a CPU reset is performed in the conventional electronic device, it takes time for restart of the device and a downtime becomes longer.

SUMMARY

According to an aspect of the present invention, provided is a control device including a first processor, a relay device, a second processor, and a third processor. The first processor is configured to perform data communications with an electronic device. The relay device is configured to relay the data communications. The relay device includes a buffer for storing data to be transmitted or received in the data communications. The second processor is configured to check a state of the buffer to detect a buffer full state in which the buffer is full. The third processor is configured to check a state of the first processor to detect a halt state in which the first processor has halted. The third processor is configured to reset the relay device upon detecting the halt state and upon the second processor detecting the buffer full state.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 6 is a flowchart of a process in which a CPU hang up occurs in the conventional electronic device equipped with a PCIe switch.

DESCRIPTION OF EMBODIMENTS

Hereinafter, descriptions will be made on embodiments of a control device and a control method of the present disclosure with reference to the accompanying drawings. The embodiments described in the following are illustrative only and are not intended to exclude applying of various modified examples and techniques not explicitly described to the embodiments. That is, the embodiments described in the present disclosure may be practiced through various modifications (e.g., by combining the embodiment and each modified example) without departing from the gist of the present disclosure. Further, each drawing does not intend to include only constitutional elements illustrated therein and may include other functionalities.

Figure 1:
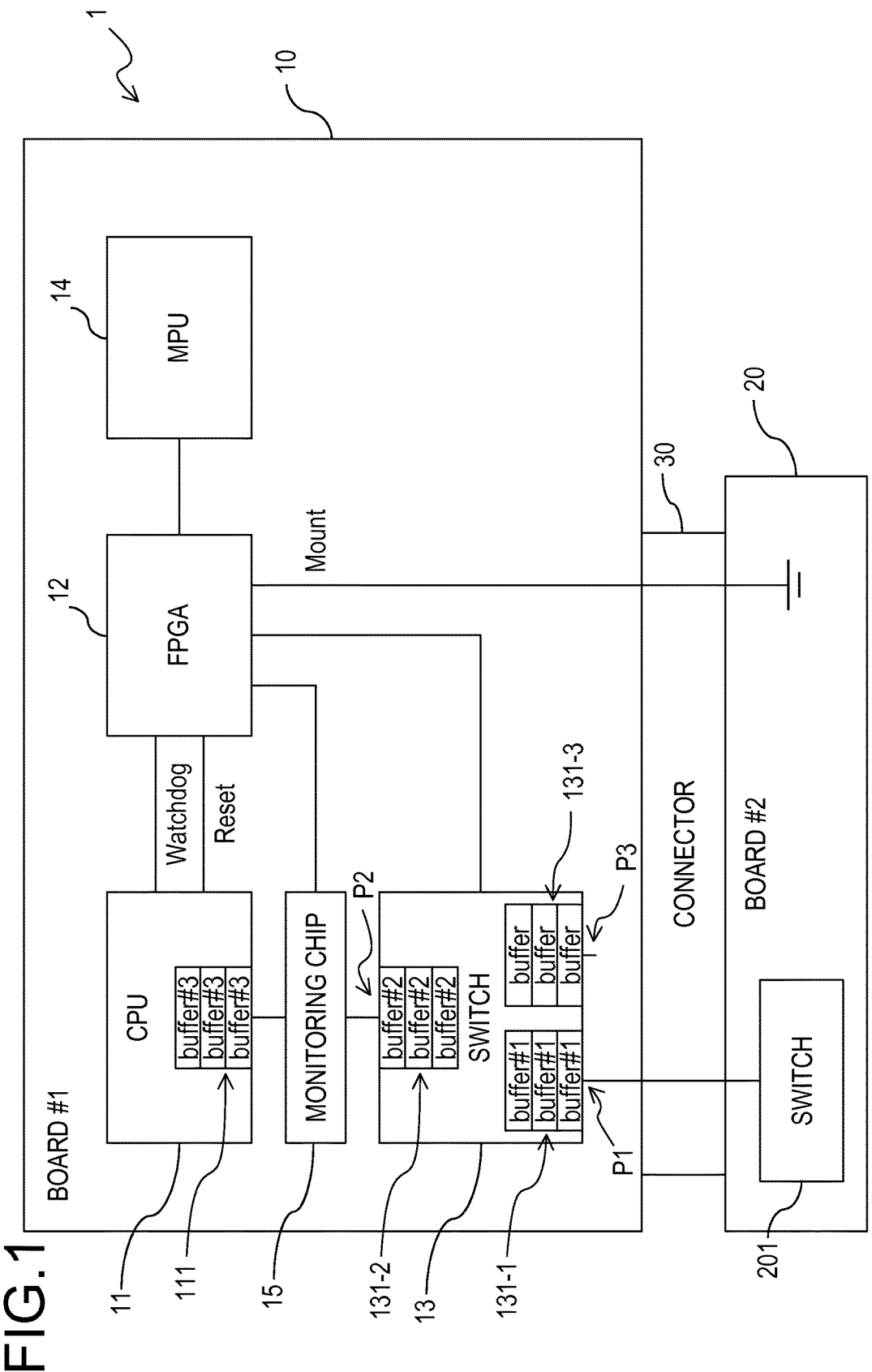
FIG. 1 is a diagram illustrating an exemplary configuration of a control device according to an embodiment.
Figure 2:
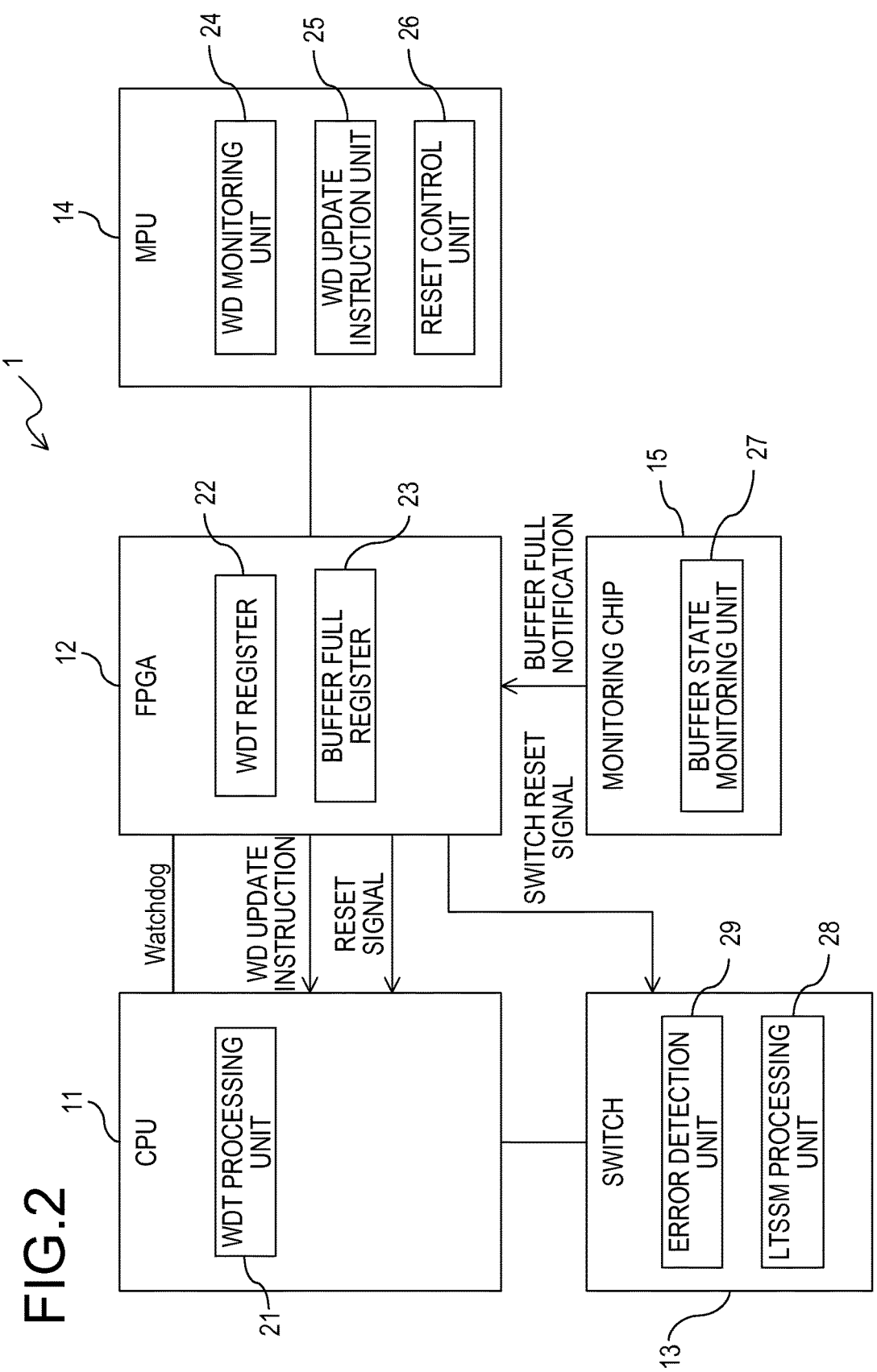
FIG. 2 is a diagram illustrating an exemplary functional configuration of the control device according to the embodiment.

FIG. 1 is a diagram illustrating an exemplary configuration of a control device according to an embodiment of the present disclosure, and FIG. 2 is a diagram illustrating an exemplary functional configuration of the control device. A control device 1 illustrated in FIG. 1 includes boards 10 and 20. The boards 10 and 20 are substrate devices. For example, the board 10 and the board 20 are a CM a CA of a storage device, respectively. Hereinafter, the board 10 and the board 20 may also be referred to as the board #1 and the board #2, respectively.

The board 10 includes a CPU 11, an FPGA 12, a switch 13, a micro-processing unit (MPU) 14, and a monitoring chip 15. The board 10 is provided with a connector 30 (connecting unit), and the board 20 to be described is detachably attached to the connector 30. The CPU 11 is a processing device performing various controls and operations. The CPU 1001 is connected to the switch 13 through a PCIe bus and communicably connected with the board 20 through the switch 1003.

The CPU 1001 is provided with a buffer 111, and data (packet) to be transmitted to the switch 13 is stored in the buffer 111. The buffer 111 includes a plurality of data storage areas, and data (packet) to be transmitted is sequentially stored in the plurality of data storage areas and handled in, for example, a FIFO fashion. Hereinafter, the buffer 111 included in the CPU 11 may also be referred to as a buffer #3.

The CPU 11 is a processing device which executes a program to implement various functions and acts, for example, as a watchdog timer (WDT) processing unit 21 as illustrated in FIG. 2. The program to implement the function as the WDT processing unit 21 is provided in a form as being recorded in a computer-readable recording medium such as, for example, a flexible disk, a compact disc (CD) such as CD-ROM, CD-R, and CD-RW, a digital versatile disc (DVD) such as DVD-ROM, DVD-RAM, DVD-R, DVD+R, DVD-RW, DVD+ RW, and HD DVD, a Blu-ray disk, a magnetic disk, an optical disk, and an opto-magnetic disk. A computer uses the program in such a way that the program is read from the recording medium and the read program is transmitted to an internal storage device or an external storage device to be stored therein. The program may be stored in a storage device (recording medium) such as, for example, the magnetic disk, the optical disk, and the opto-magnetic disk to be provided to the computer from the storage device through a communication path.

When it is intended to implement the function as the WDT processing unit 21, the program stored in the internal storage device, for example, a random access memory (RAM) or a read-only memory (ROM) not illustrated is executed by a microprocessor (CPU 11 in the present embodiment) of the computer. The program recorded in the recording medium may be read and executed by the computer.

The WDT processing unit 21 periodically performs a write access (watchdog write) to a WDT register 22 included in the FPGA 12 to be described below. Accordingly, the MPU 14 to be described below may recognize that the CPU 11 is being normally operated. Hereinafter, performing the watchdog write to the WDT register 22 may also be referred to as a watchdog (WD) update. When a WD update instruction is received from the MPU 14 (FPGA 12), the WDT processing unit 21 performs the watchdog write to WDT register 22 in response to the WD update instruction.

The CPU 11 has a function of issuing a Port Disable to reset the state of the LTSSM, upon receipt of a notification that the LTSSM is in an abnormal state from the switch 13 (LTSSM processing unit 28) which will be described below. When the state of the LTSSM is reset, a buffer 131 of the switch 13 is cleared (released). The FPGA 1002 is an integrated circuit for which arbitrary configuration may be set up and implements various functions according to preset settings.

For example, when the WD update instruction is received from the MPU 14, the FPGA 12 transmits a WD update instruction to the CPU 11 in response to the received WD update instruction. The FPGA 12 inputs, for example, a non-maskable interrupt (NMI) to the CPU 11 to notify the CPU 11 of the WD update instruction. When a system reset instruction is received from the MPU 14, the FPGA 12 performs a system reset for the control device 1. The resetting of the system by the FPGA 12 may be implemented with a known method, and details thereof will be omitted.

When a switch reset instruction is received from the MPU 14, the FPGA 12 outputs a switch reset signal to the switch 13 such that only the switch 13 is reset. Specifically, the FPGA 12 inputs the switch reset signal to a reset port (not illustrated) of the switch 13 to reset the switch 13. The FPGA 12 includes the WDT register 22 and a buffer full register 23. The value stored in the WDT register 22 is updated by the watchdog write performed periodically by the CPU 11 (WDT processing unit 21) described above. Accordingly, a WD monitoring unit 24 of the MPU 14 to be described below may check a value of the WDT register 22 to determine whether the WD update by the WDT processing unit 21 is performed.

A flag indicating that any one of the buffer #2 of the switch 13 and the buffer #3 of the CPU 11 becomes full (falls in a buffer full state) is set in the buffer full register 23. The flag of the buffer full register 23 is set by a buffer state monitoring unit 27 of the monitoring chip 15 to be described below. The MPU 14 may refer to the value of the buffer full register 23 to determine whether any one of the buffer #2 of the switch 13 and the buffer #3 of the CPU 11 is in the buffer full state.

The switch 13, a so-called PCIe switch, is a relay device (a relay unit) which relays a data transfer in accordance with a PCIe protocol. The switch 13 includes a plurality of ports, and devices serving as data transmission sources and data transmission destinations are connected to the ports. In an example illustrated in FIG. 1, three ports (ports P1, P2, and P3) are included in the switch 13. A switch 201 of the board 20 is connected to the port P1. The CPU 11 is connected to the port P2.

Each of the ports P1, P2, and P3 includes the buffer 131 and data to be transmitted through the port is stored in the buffer 131. Hereinafter, the buffer 131 provided for the port P1 is referred to as a buffer 131-1. Similarly, the buffers 131 provided for the ports P2 and P3 are referred to as a buffer 131-2 and a buffer 131-3, respectively. Hereinafter, as the reference numerals denoting the buffer, the reference numerals "131-1", "131-2", and "131-3" are used when intending to specify one of a plurality of buffers, and the reference numeral "131" is used when intending to indicate any buffer.

Each buffer 131 includes a plurality of data storage areas, and data (packet) to be transmitted is sequentially stored in the plurality of data storage areas and handled in, for example, a FIFO fashion. Hereinafter, for the convenience of explanation, the buffer 131-1 and buffer 131-2 of the switch 13 may also be referred to as the buffer #1 and the buffer #2, respectively. In the switch 13, when the switch reset signal is input to the reset port, not illustrated in FIG. 1, from the FPGA 12, only the switch 13 is reset. When the switch 13 is reset, the respective buffers 131 provided in the switch 13 are cleared.

The switch 13 includes a processor such as a CPU not illustrated, and the processor executes a program so as to act as an error detection unit 29 and the LTSSM processing unit 28. The program to implement the functions as the error detection unit 29 and the LTSSM processing unit 28 is provided in a form as being recorded in a computer-readable recording medium such as, for example, a flexible disk, a CD (CD-ROM, CD-R, and CD-RW), a DVD (DVD-ROM, DVD-RAM, DVD-R, DVD+ R, DVD-RW, DVD+ RW, and HD DVD), a Blu-ray disk, a magnetic disk, an optical disk, and an opto-magnetic disk. A computer uses the program in such a way that the program is read from the recording medium and the read program is transmitted to an internal storage device or external storage device to be stored therein. The program may be stored in a storage device (recording medium) such as, for example, the magnetic disk, the optical disk, the opto-magnetic disk to be provided to the computer from the storage device through a communication path.

When it is intended to implement the functions as the error detection unit 29 and the LTSSM processing unit 28, the program stored in the internal storage device (RAM or ROM not illustrated in the present embodiment) is executed by a microprocessor (processor in the present embodiment) of the computer. The program recorded in the recording medium may be read and executed by the computer.

The error detection unit 29 has a function of detecting an occurrence of an error in the PCIe communication and detects, for example, an occurrence of a correctable error or an uncorrectable error. For example, when a link partner (board #2) connected through the PCIe communication is abruptly removed or a power supply is disconnected, a disconnection occurs in the physical layer. It is known empirically that the disconnection causes a correctable error.

When the occurrence of the correctable error is detected, the error detection unit 29 notifies the CPU 11 of the occurrence of the correctable error. The LTSSM processing unit 28 performs a processing regarding the LTSSM state. Upon receiving the notification of the occurrence of the correctable error from the error detection unit 29, the CPU 11 asks the LTSSM processing unit 28 for the LTSSM state. In general, in the PCIe, the LTSSM state is "L0" in a normal operation state.

The LTSSM processing unit 28 notifies the CPU 11 of the LTSSM state. When the LTSSM state is in a state other than "L0" (normal operation state), that is, an abnormality has occurred in a state of the PCIe link, the CPU 11 detects the abnormality in the LTSSM. The CPU 11 detects the abnormality in the link on the basis of the LTSSM state notified from the switch 13 (LTSSM processing unit 28) and issues the Port Disable to reset the LTSSM state. When the LTSSM state is rest, the buffer 131 of the switch 13 to be described below is cleared (released).

Accordingly, when the correctable error occurs in the switch 13, the CPU 11 checks a communication state of the switch 13. When an abnormality has occurred in the communication state (in a case where the LTSSM state is not "L0"), the CPU 11 acts as a port invalidation unit to invalidate the ports of the switch 13. When the buffer 111 of the CPU 11 becomes a buffer full state before the CPU 11 resets the LTSSM state, the CPU 11 may be hung up.

The monitoring chip 15 is a circuit device placed on a communication path (PCIe bus) which connects the CPU 11 and the port P2 of the switch 13. The monitoring chip 15 monitors the data (packet) sent and received between the CPU 11 and the switch 13, and acts as a monitoring device to monitor a state of the buffer #3 of the CPU 11 and a state of the buffer #2 of the switch 13. The PCIe is a serial bus and supports a full-duplex communication such that a packet transmission path and a packet reception path are present individually. The packets transmitted/received through the PCIe bus include a packet used to manage the PCIe link in addition to a transaction layer packet (TLP) which handles a processing such as a data read/write. Both types of packets are transmitted/received using the same path (serial bus).

A data transmission and reception device (hereinafter, referred to as a PCIe device) compliant with the PCIe protocol includes a reception buffer in which the TLP data intended to be transferred to an upper level system is temporarily accumulated. The buffer 111 and the buffer 131 described above act as the reception buffer. In the PCIe, a flow control is performed using free space information indicating a free space available in the reception buffer. That is, when the PCIe device at the reception side receives a TLP, the TLP data is temporarily accumulated in the reception buffer. Then, when the TLP data accumulated in the reception buffer is transferred to the upper level system and a free space is created in the reception buffer, the free space information is transferred to a PCIe device at the transmission side as flow control information. The PCIe device at the transmission side controls a transmission amount of TLP data on the basis of the received flow control information. In the PCIe, the flow control information is transmitted using a packet referred to as an update flow control (FC) data link layer packet (DLLP). Hereinafter, the update FC DLLP is referred to as an update FC packet. That is, the update FC packet acts as buffer state information which notifies a use situation (vacancy, buffer state) of the reception buffers 111 and 131. When no update is made to the update FC packet, it may be considered that the reception buffers 111 and 131 are blocked, that is, the reception buffers 111 and 131 are in a buffer full state.

Similarly to a repeater, the monitoring chip 15 is connected to and placed on a PCIe line which connects the CPU 11 and the switch 13, for example, as an electronic chip which snoops the update FC packet. The monitoring chip 15 acts as a buffer state monitoring unit 27. The buffer state monitoring unit 27 monitors the update FC packets sent and received between the CPU 11 and the switch 13, and determines that a buffer full state has occurred in at least one of the CPU 11 and the switch 13 when no update is made to the update FC packet for a predetermined period of time.

For example, the monitoring chip 15 includes a storage unit for storing the received update FC packet, and receives the update FC packet each time when a predetermined period of time elapses, and stores the received update FC packet into the storage unit. When the update FC packet is received, the buffer state monitoring unit 27 compares the previously received update FC packet stored in the storage unit with the currently received update FC packet. In this way, the buffer state monitoring unit 27 determines whether the update FC packet is updated.

When it is determined that the update FC packet is not updated, the buffer state monitoring unit 27 determines whether a situation where the update FC packet is not updated is temporal or is being continued for a predetermined period of time. For example, when it is detected that the update FC packet is not updated, the buffer state monitoring unit 27 determines again whether the update FC packet is updated, after a predetermined period of time has elapsed. When it is determined that the update FC packet has not been updated, the buffer state monitoring unit 27 detects that the buffer full state has occurred. In this way, the buffer state monitoring unit 27 acts as a buffer full detection unit to detect the buffer full state of the buffer 131 on the basis of the update FC packet communicated between the CPU 11 and the switch 13.

When it is determined that a buffer full state has occurred and the buffer full state is being continued for a predetermined period of time, the buffer state monitoring unit 27 notifies the FPGA 12 and the MPU 14 that the buffer full state has occurred in the buffer of the switch 13. Specifically, when an occurrence of the buffer full state is detected, the buffer state monitoring unit 27 sets, in the buffer full register 23 of the FPGA 1, a value (flag) indicating the occurrence of the buffer full state 2. The MPU 14 to be described below refers to the buffer full register 23 of the FPGA 12 to detect the occurrence of the buffer full state. That is, the buffer state monitoring unit 27 notifies the MPU 14 through the FPGA 12 that the buffer full state has occurred in the switch 13.

Hereinafter, a notification that the buffer full state has occurred in the switch 13, which is delivered to the MPU 14 through the FPGA 12 by the buffer state monitoring unit 27 (the monitoring chip 15), may also be referred to as a buffer full notification. The switch 13 has a function of detecting an occurrence of an error in the PCIe communication to detect, for example, an occurrence of a correctable error or an uncorrectable error. Detecting the occurrence of a correctable error or an uncorrectable error may be implemented with a known method, and descriptions thereof will be omitted.

For example, when the occurrence of the correctable error is detected, the switch 13 notifies the CPU 11 of the occurrence of the correctable error. Upon being notified of the occurrence of the correctable error from the switch 13, the CPU 11 checks the LTSSM state as described above. The MPU 14 is a processing device to execute a program to implement various functions and acts as, for example, the WD monitoring unit 24, a WD update instruction unit 25, and a reset control unit 26, as illustrated in FIG. 2.

The program to implement the functions as the WD monitoring unit 24, the WD update instruction unit 25, and the switch reset control unit 26 is provided in a form of being recorded in a computer-readable recording medium such as, for example, a flexible disk, a CD (CD-ROM, CD-R, and CD-RW), a DVD (DVD-ROM, DVD-RAM, DVD-R, DVD+ R, DVD-RW, DVD+ RW, and HDDVD), a Blu-ray disk, a magnetic disk, an optical disk, and an opto-magnetic disk. Also, a computer uses the program in such a way that the program is read from the recording medium and the read program is transmitted to an internal storage device or external storage device to be stored therein. The program may be stored in a storage device (recording medium), for example, the magnetic disk, the optical disk, the opto-magnetic disk to be provided to the computer from the storage device through a communication path.

When it is intended to implement the functions as the WD monitoring unit 24, the WD update instruction unit 25, and the switch reset control unit 26, the program stored in the internal storage device (RAM or ROM not illustrated in the present embodiment) is executed by a microprocessor (MPU 14 in the present embodiment) of the computer. The program recorded in the recording medium may be read and executed by the computer.

The WD monitoring unit 24 periodically monitors the value of the WDT register 22 of the FPGA 12 and determines whether the WDT register 22 is updated. That is, the WD monitoring unit 24 monitors the watchdog by the WDT processing unit 21 of the CPU 11 to determine whether the CPU 11 is in a normal state. That is, the WD monitoring unit 24 acts as a halt state detection unit to detect a halt state (hung up state) of the CPU 11.

An interval at which the WD monitoring unit 24 monitors the WDT register 22 may be longer than an interval at which the WDT processing unit 21 of the CPU 11 performs a watchdog write to the WDT register 22. The WD monitoring unit 24 stores the value of the WDT register 22 read each time when a predetermined period time has elapsed in a predetermined area of, for example, a memory, and compares the newly read value of the WDT register 22 with the value previously read and stored in the WDT register 22. With this configuration, the WD monitoring unit 24 determines whether the WDT register 22 has been updated.

When it is detected that the WDT register 22 has not been updated, the WD monitoring unit 24 notifies the WD update instruction unit 25 that the WDT register 22 has not been updated. When a notification that the WDT register 22 has not been updated is sent from the WD monitoring unit 24, the WD update instruction unit 25 (update instruction unit) sends a WD update instruction to the WDT processing unit 21 of the CPU 11 through the FPGA 12. That is, the MPU 14 notifies the FPGA 12 of the WD update instruction, and the FPGA 12 notifies the CPU 11 of a WD update instruction in accordance with the WD update instruction notified from the MPU 14.

When the watchdog update is not performed by the CPU 11 even though the WD update instruction unit 25 instructs the CPU 11 to perform the WD update as described above, it may be determined that the CPU 11 is in a hung up state for some reason. The reset control unit 26 controls a reset process in the control device 1. For example, the reset control unit 26 sends a system reset instruction to the FPGA 12 in order for the FPGA 12 to perform a system reset of the control device 1.

In addition, the reset control unit 26 sends a switch reset instruction to the FPGA 12 in order for the FPGA 12 to reset only the switch 13. As described above, when the watchdog update is not performed by CPU 11, at first sight it may seem that the CPU 11 is in the hung up state. However, when the buffer full state is detected in the switch 13, it is considered that the CPU 11 becomes in a temporal hung up state caused by the buffer #3 that is in the buffer full state. In this case, the buffer #3 of the CPU 11 is cleared such that the CPU 11 may be returned to a normal operation state.

When the reset control unit 26 resets only the switch 13, the buffer 131 of the switch 13 is cleared and a link between the switch 13 and the CPU 11 is down such that the data stored in the buffer 111 of the CPU 11 is discarded. That is, the buffer 131 of the switch 13 is cleared and the temporal hung up state of the CPU 11 is eliminated. When the hung up state (halt state) of the CPU 11 is detected by the WD monitoring unit 24 and the buffer full state of the buffer 131 is detected by the buffer state monitoring unit 27, the reset control unit 26 acts as a reset processing unit to reset the switch 13.

Figure 3:
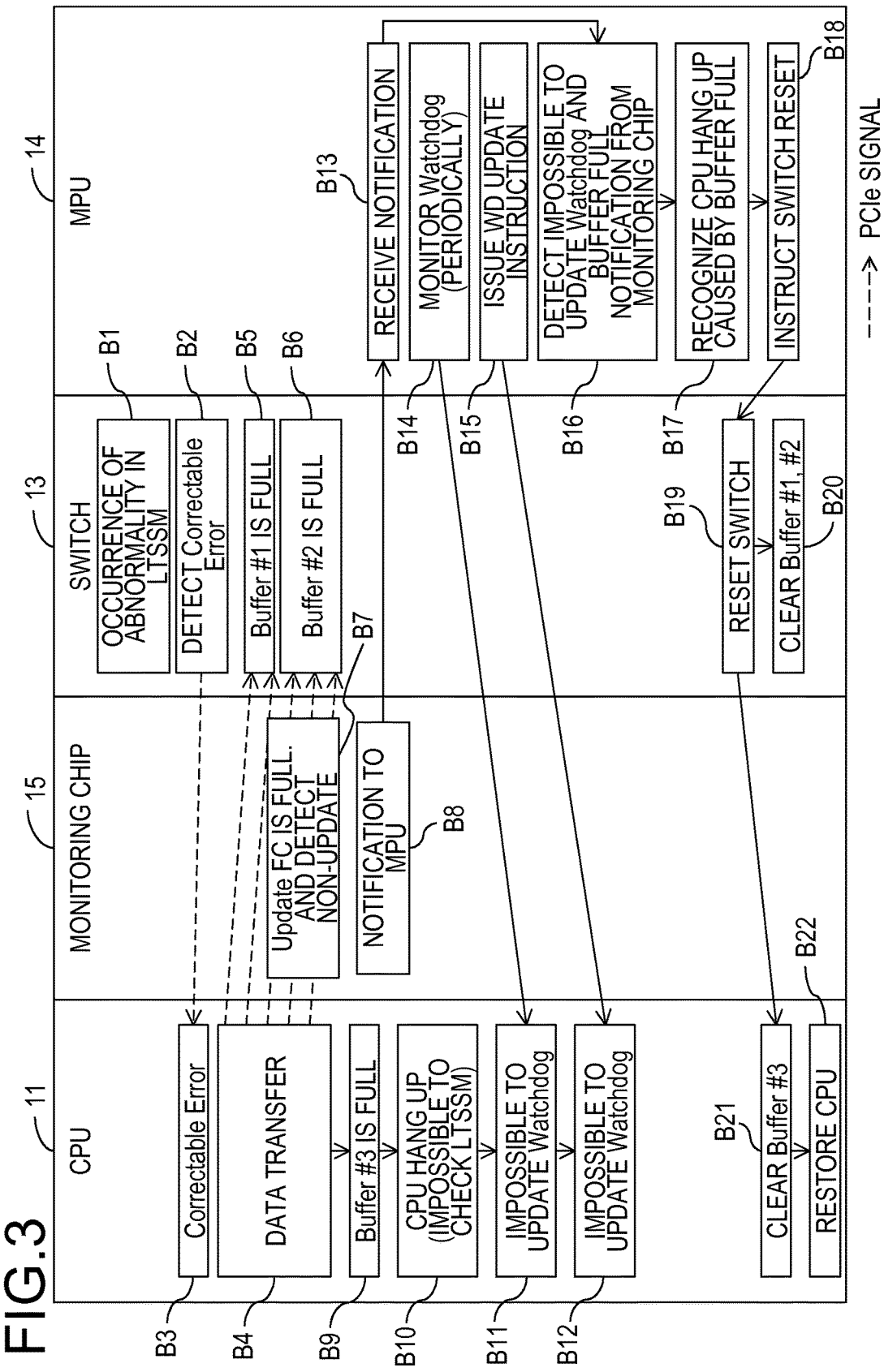
FIG. 3 is a sequence diagram illustrating a switch reset process in the control device according to the embodiment.

Descriptions will be made on a reset process of the switch 13 in the control device 1 as an example of the embodiment configured as described above with reference to the sequence diagram illustrated in FIG. 3. In the following, an example is described in which an abnormality in the LTSSM has occurred in the switch 13, and in this case, the LTSSM state of the switch 13 is assumed as not "L0". When the abnormality in the LTSSM occurs in the switch 13 (B1), a correctable error is detected (B2). The switch 13 notifies the CPU 11 of the detection of the correctable error (B3).

The CPU 11 transfers data to the board #2 through the switch 13 (B4). In the switch 13, the buffer #1 becomes the buffer full state (B5) and then, the buffer #2 also becomes the buffer full state (B6). The buffer #3 becomes the buffer full state (B9) in the CPU 11, and the CPU 11 becomes the hung up state (CPU hang up) (B10). When the CPU 11 is hung up, the CPU 11 is unable to ask the LTSSM processing unit 28 for the LTSSM state and unable to perform the watchdog update by the WDT processing unit 21 as well (B11).

When the buffer #2 becomes the buffer full state in the switch 13, the update FC packet sent and received between the switch 13 and the CPU 11 represents that the buffer is full. When the monitoring chip 15 refers to the update FC packet to detect that the buffer full state has occurred on the PCIe path and the buffer full state is being continued for a predetermined period of time (B7), the monitoring chip 15 sets a flag in the buffer full register 23 of the FPGA 12 to notify (buffer full notification) the MPU 14 of the buffer full state (B8).

The MPU 14 detects that the flag is set in the buffer full register 23 of the FPGA 12 to recognize that the occurrence of buffer is notified (B13). In the MPU 14, the WD monitoring unit 24 periodically monitors the value of the WDT register 22 of the FPGA 12 and determines whether the WDT register 22 is updated (B14). When it is detected that the WDT register 22 is not updated, the WD monitoring unit 24 notifies the WD update instruction unit 25 that the WDT register 22 is not updated.

When the notification that the WDT register 22 is not updated is sent from the WD monitoring unit 24, the WD update instruction unit 25 sends a WD update instruction to the WDT processing unit 21 of the CPU 11 through the FPGA 12 (B15). The FPGA 12 which has received the WD update instruction notifies the CPU 11 of the WD update instruction by inputting an NMI to the CPU 11. However, since the CPU 11 is in the hung up state at this time, the CPU 11 is unable to perform the watchdog update even when the WD update instruction is received (B12).

In the MPU 14, the reset control unit 26 detects that the buffer full notification is sent from the monitoring chip 15 and that the watchdog update by the CPU 11 is not performed even when the WD update instruction is sent by the WD update instruction unit 25 (B16). In this way, in a case where the buffer full state has occurred in the switch 13 and where the watchdog update by the CPU 11 is not performed even when the WD update instruction is sent, the reset control unit 26 recognizes that the CPU 11 is in a temporal hung up state caused by blocking (buffer full state) of the buffer #3 (B17).

The reset control unit 26 sends a switch reset instruction to the switch 13 (B18). The switch 13 is reset by the switch reset instruction (B19), and the buffers #1 and #2 of the switch 13 are cleared (B20). When the switch 13 is reset, the link between the switch 13 and the CPU 11 is down such that the data stored in the buffer 111 of the CPU 11 is discarded. That is, the buffer #3 of the CPU 11 is cleared (B21) and the CPU 11 is restored (B22).

Figure 4:
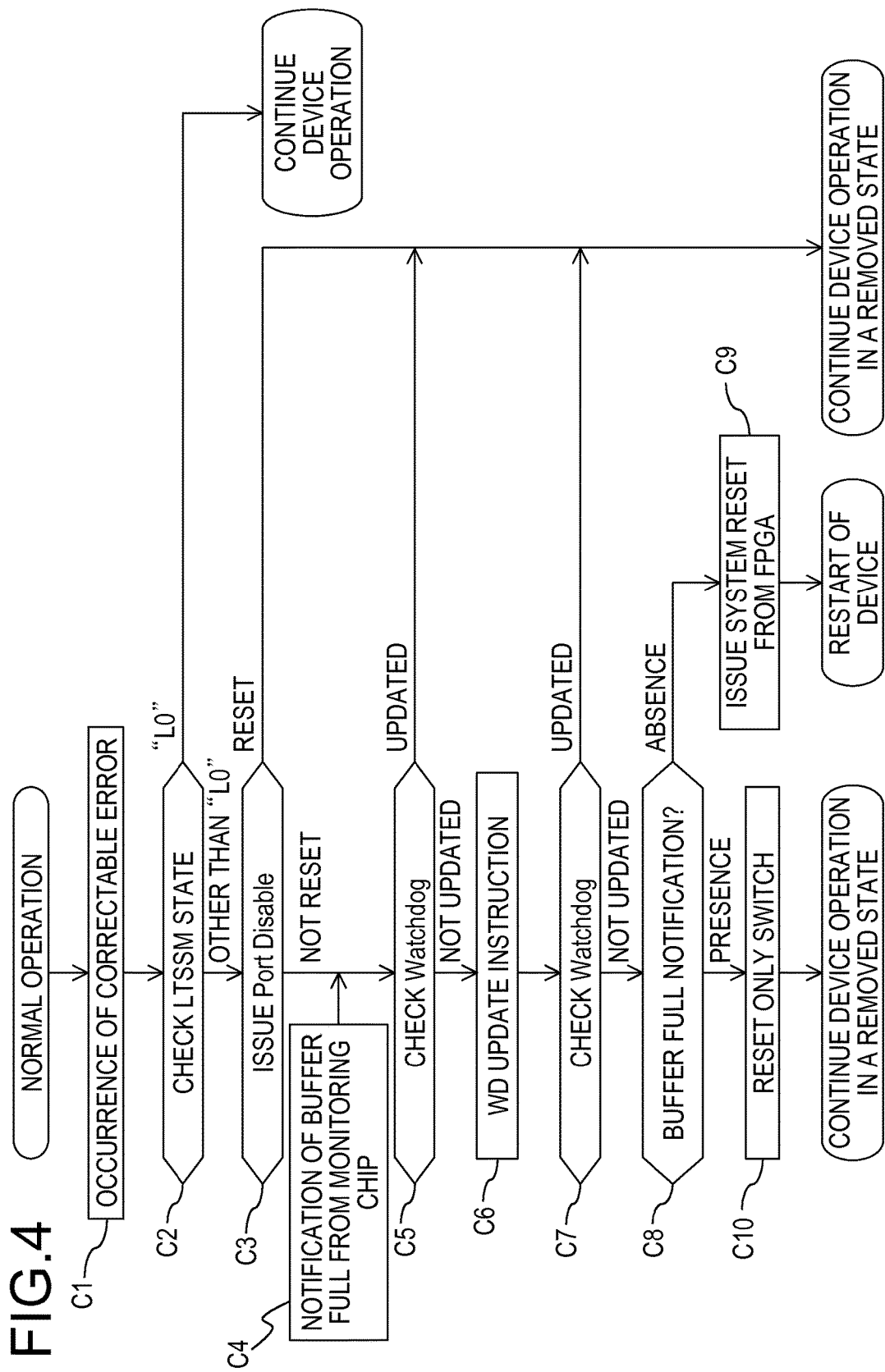
FIG. 4 is a flowchart of a process performed at the time of occurrence of a correctable error in the control device according to the embodiment.
Figure 5:
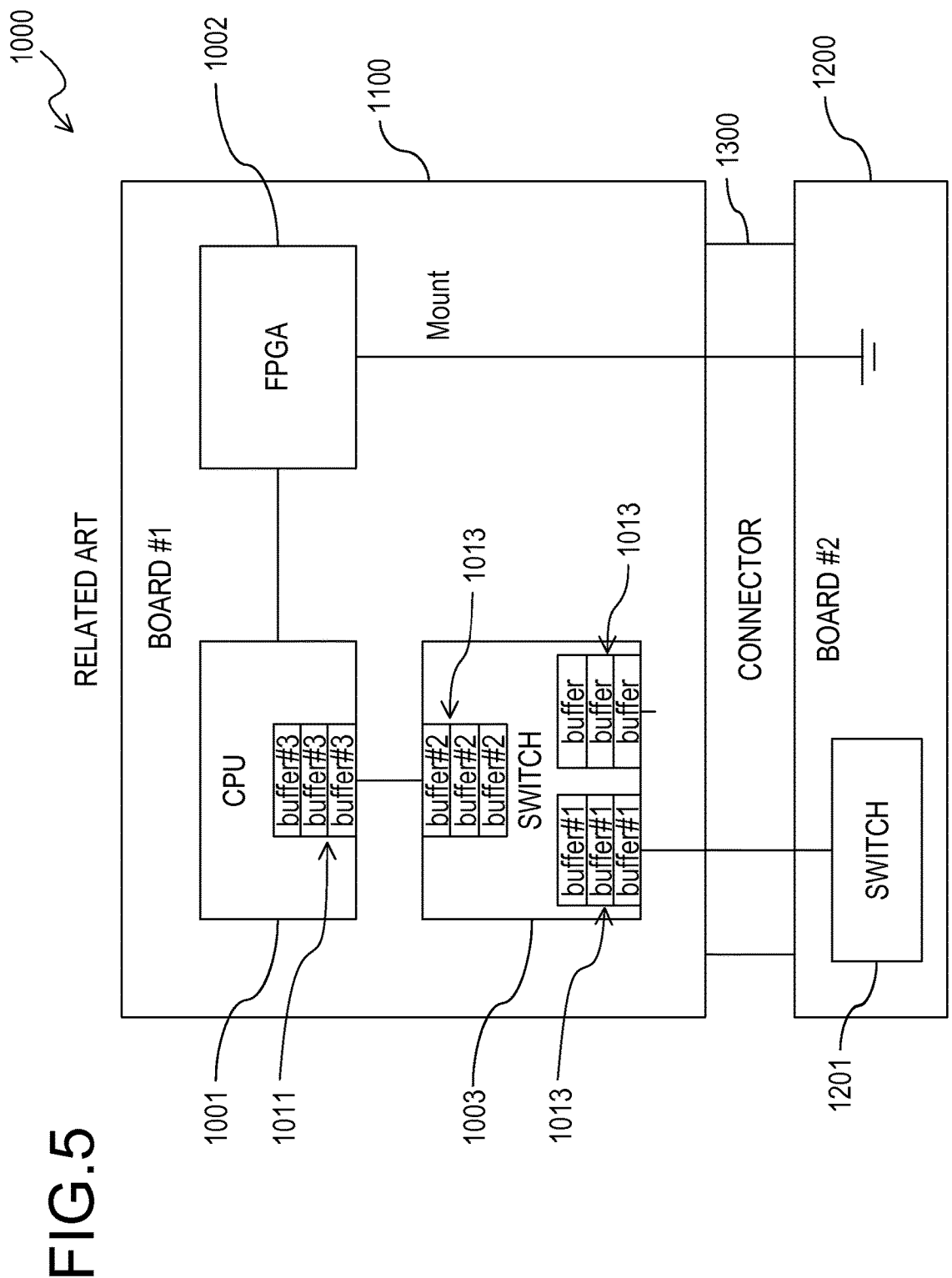
FIG. 5 is a diagram illustrating a configuration of a conventional electronic device equipped with a PCIe switch.

Next, descriptions will be made on a process to be performed when a correctable error has occurred in the control device 1 as an example of the embodiment configured as described above with reference to the flowchart illustrated in FIG. 4. When the error detection unit 29 of the switch 13 detects the occurrence of the correctable error (C1), the LTSSM processing unit 28 checks the LTSSM (C2). When it is determined that the LTSSM state is "L0" ("L0" at C2), the control device 1 is regarded as being operated normally and thus the control device 1 continues its operation.

When it is determined that the LTSSM state has a value other than "L0" (other than "L0" at C2), the CPU 11 issues a Port Disable (C3). When the LTSSM is reset (Reset at C3) due to the issuance of the Port Disable, for example, a port P1 of the switch 13 becomes disabled. Accordingly, the board #2 becomes in a state of being removed and the control device 1 is able to continue its operation.

In a case where the LTSSM is not reset (Not Reset at C3) even when the Port Disable is issued, the process proceeds to C5. The WD monitoring unit 24 of the MPU 14 determines, by checking the WDT register 22 of the FPGA 12, whether the watchdog update by the CPU 11 is performed (C5).

When the monitoring chip 15 sets, in the buffer full register 23 of the FPGA 12, the value (flag) indicating that the buffer full state has occurred, that is, when the buffer full notification is performed by the switch 13 (C4), the process also proceeds to C5. When it is determined that the watchdog update has been performed (Updated at C5), the board #2 is in a state of being removed, and thus the control device 1 continues its operation.

When it is determined that the watchdog update has not been performed (Not Updated at C5), the WD update instruction unit 25 sends a WD update instruction to the WDT processing unit 21 of the CPU 11 through the FPGA 12 (C6). The WD monitoring unit 24 of the MPU 14 determines again whether the watchdog update is performed (C7).

When it is determined that the watchdog update has been performed (Updated at C7), the board #2 is in a state of being removed, and thus, the control device 1 continues its operation. When it is determined that the watchdog update has not been performed (Not Updated at C7), it is determined whether the buffer full notification is performed by the monitoring chip 15 (C8). That is, it is determined whether the value (flag) indicating that the buffer full state has occurred is set in the buffer full register 23 of the FPGA 12 by the monitoring chip 15.

When it is determined that the value (flag) indicating that the buffer full state has occurred is not set in the buffer full register 23 (Absence at C8), the process proceeds to C9. The reset control unit 26 sends a system reset instruction to the FPGA 12 in order for the FPGA 12 to perform the system reset of the control device 1 (C9). Accordingly, the control device 1 is restarted.

When it is determined that the value (flag) indicating that the buffer full state has occurred is set in the buffer full register 23 of the FPGA 12 (Presence at C8), the process proceeds to C10. The reset control unit 26 sends a switch reset instruction to the FPGA 12 in order for the FPGA 12 to reset only the switch 13 (C10). Accordingly, the board #2 becomes in a state of being removed and the control device 1 is able to continue its operation.

As described above, according to the control device 1 as an example of the present embodiment, the monitoring chip 15 placed on the PCIe bus connecting the CPU 11 with the port P2 of the switch 13 monitors update FC packets transmitted/received over the same bus to detect the buffer full state. In a case where the buffer full notification is performed by the monitoring chip 15 even when the watchdog update is not performed by the CPU 11, the reset control unit 26 transmits the switch reset instruction to the FPGA 12 to reset only the switch 13.

In this way, the buffer 131 of the switch 13 is cleared and a link between the switch 13 and the CPU 11 is down such that the data stored in the buffer 111 of the CPU 11 is discarded. That is, the buffer #3 of the CPU 11 is cleared and the temporal hung up state of the CPU 11 is eliminated. Accordingly, the device may be restored without turning off the power supply of the CPU 11 and the influence on business may be suppressed to the minimum.

The present disclosure is not limited to the embodiment described above and may be variously modified and practiced without departing from the gist of the embodiment. Constitutional elements and processes of the embodiment may be selected as needed and appropriately combined. For example, in the embodiment described above, the monitoring chip 15 is, similarly to a repeater, connected to and placed on a PCIe line which connects the CPU 11 and the switch 13, but the present disclosure is not limited thereto. That is, the monitoring chip 15 may be implemented by installing the same function as the monitoring chip 15 into any of the switch 13, the CPU 11, and the FPGA 12. In this case, the function as the monitoring chip 15 may be implemented by, for example, causing a processor to execute the program instead of being implemented by an electronic device, and may be implemented in various modifications.

In the embodiment described above, an example is described in which the board 10 is a CM and the board 20 is a CA of the storage device, but the present disclosure is not limited thereto, and may be other devices. In the embodiment described above, an example is described in which the switch 13 is a PCIe switch and data transfer is performed in a communication system based on the PCIe protocol, but the present disclosure is not limited thereto, and may be applied to a communication system based on other communication protocols. For example, the present disclosure may be applied to a communication system based on, for example, the serial attached small computer system interface (SAS) or Fibre Channel (FC).

In the embodiment described above, for example, three ports P1, P2, and P3 are included in the switch 13, but the present disclosure is not limited thereto, and may be implemented in various modifications. That is, even though the switch 13 is provided with two ports, or four or more ports, the present disclosure may be implemented in various modifications. A person having an ordinary skill in the art may implement and manufacture the present embodiment based on the matters set forth in the present disclosure that has been described in detail.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A control device, comprising:
   a first processor configured to
     perform data communications with an electronic device;
   a relay device configured to
     relay the data communications, the relay device including a buffer for storing data to be transmitted or received in the data communications;
   a second processor configured to
     check a state of the buffer to detect a buffer full state in which the buffer is full; and
   a third processor configured to
     check a state of the first processor to detect a halt state in which the first processor has halted, and
     reset the relay device upon detecting the halt state and upon the second processor detecting the buffer full state.

2. The control device according to claim 1, wherein
   the second processor is placed on a communication path connecting the first processor and the relay device, and
   the second processor is configured to
     detect the buffer full state on basis of information which is communicated between the first processor and the relay device, the information indicating whether the buffer is full.

3. The control device according to claim 1, wherein
   the third processor is configured to
     detect the halt state by referring to information which is updated by the first processor.

4. The control device according to claim 3, wherein
   the third processor is configured to
     send the first processor an instruction to update the information.

5. The control device according to claim 1, wherein
the second processor is configured to
check the state of the buffer upon the third processor detecting the halt state.

6. The control device according to claim 1, wherein
the first processor is configured to
detect an abnormality in the relay device, and
perform, upon detecting the abnormality, port invalidation of invalidating a port of the relay device,
the third processor is configured to
detect the halt state when the abnormality is not eliminated even though the port invalidation is performed, and
the second processor is configured to
detect the buffer full state when the abnormality is not eliminated even though the port invalidation is performed.

7. A control method performed by a control device including a first processor, a second processor, a third processor, and a relay device including a buffer for storing data to be transmitted to or received from the first processor, the control method comprising:
checking, by the second processor, a state of the buffer to detect a buffer full state in which the buffer is full;
checking, by the third processor, a state of the first processor to detect a halt state in which the first processor has halted, and
resetting, by the third processor, the relay device upon detecting the halt state and upon the second processor detecting the buffer full state.

8. The control method according to claim 7, wherein
the second processor detects the buffer full state on basis of information which is communicated between the first processor and the relay device, the information indicating whether the buffer is full.

9. The control method according to claim 7, wherein
the third processor detects the halt state by referring to information which is updated by the first processor.

10. The control method according to claim 9, further comprising:
sending by the third processor, to the first processor, an instruction to update the information.

11. The control method according to claim 7, wherein
the second processor checks the state of the buffer upon the third processor detecting the halt state.

12. The control method according to claim 7, further comprising:
detecting, by the first processor, an abnormality in the relay device; and
performing by the first processor, upon detecting the abnormality, port invalidation of invalidating a port of the relay device,
wherein
the third processor detects the halt state when the abnormality is not eliminated even though the port invalidation is performed, and
the second processor detects the buffer full state when the abnormality is not eliminated even though the port invalidation is performed.

* * * * *